Figure 1:
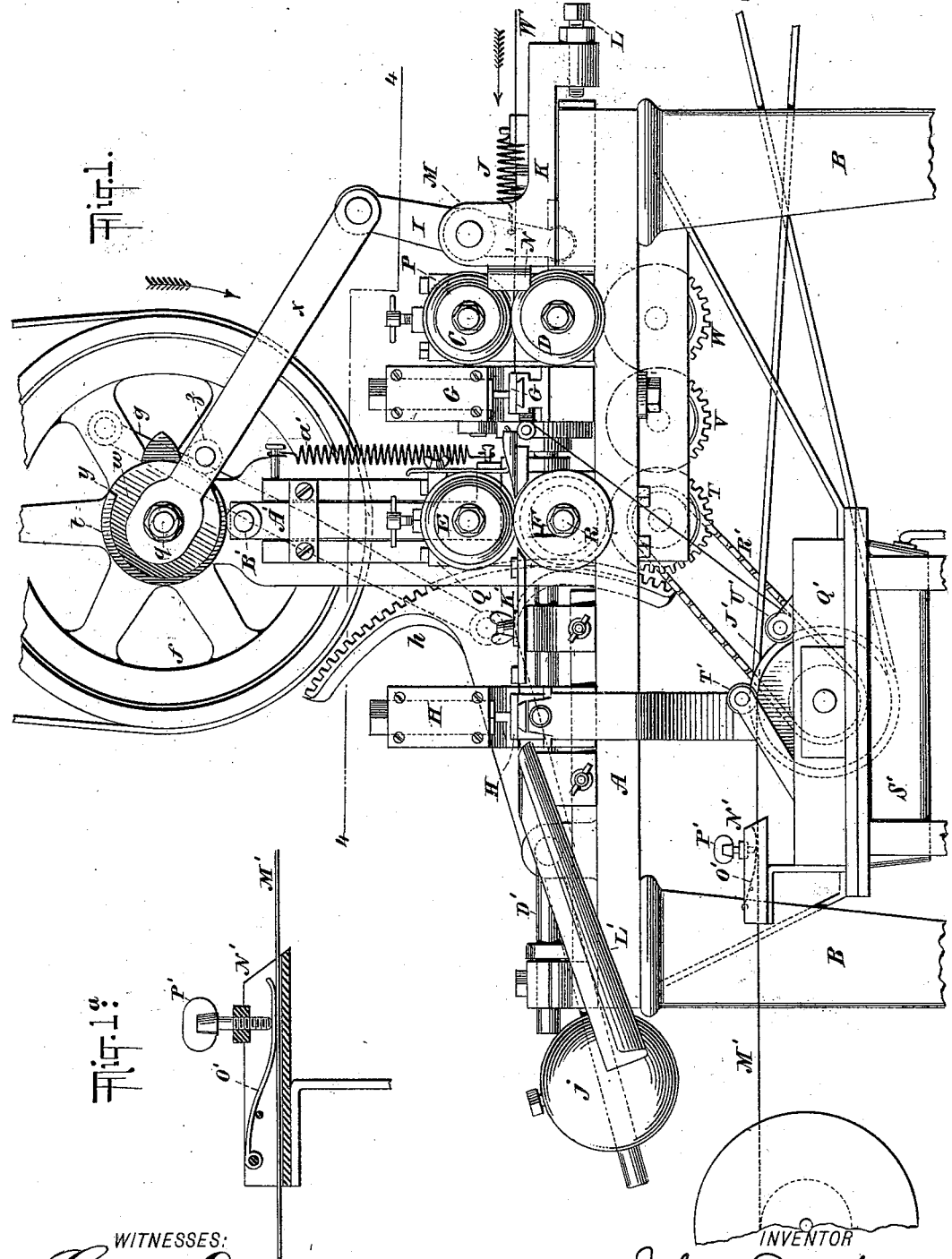

(No Model.) 7 Sheets—Sheet 1.
J. DRAHER.
MACHINE FOR MAKING CORSET STIFFENERS.
No. 543,856. Patented Aug. 6, 1895.

WITNESSES:
Gustav Dieterich
Ed. D. Miller

INVENTOR
John Draher,
BY
Chas. C. Gill
ATTORNEY.

(No Model.) 7 Sheets—Sheet 4.

J. DRAHER.
MACHINE FOR MAKING CORSET STIFFENERS.

No. 543,856. Patented Aug. 6, 1895.

WITNESSES:
Gustave Dieterich
Ed. D. Miller

INVENTOR
John Draher,
BY
Chas. C. Gill
ATTORNEY.

(No Model.) 7 Sheets—Sheet 5.

J. DRAHER.
MACHINE FOR MAKING CORSET STIFFENERS.

No. 543,856. Patented Aug. 6, 1895.

WITNESSES:
Gustave Dietrich
Ed. D. Miller

INVENTOR
John Draher,
BY Chas. O. Gill
ATTORNEY.

(No Model.) 7 Sheets—Sheet 6.
J. DRAHER.
MACHINE FOR MAKING CORSET STIFFENERS.
No. 543,856. Patented Aug. 6, 1895.
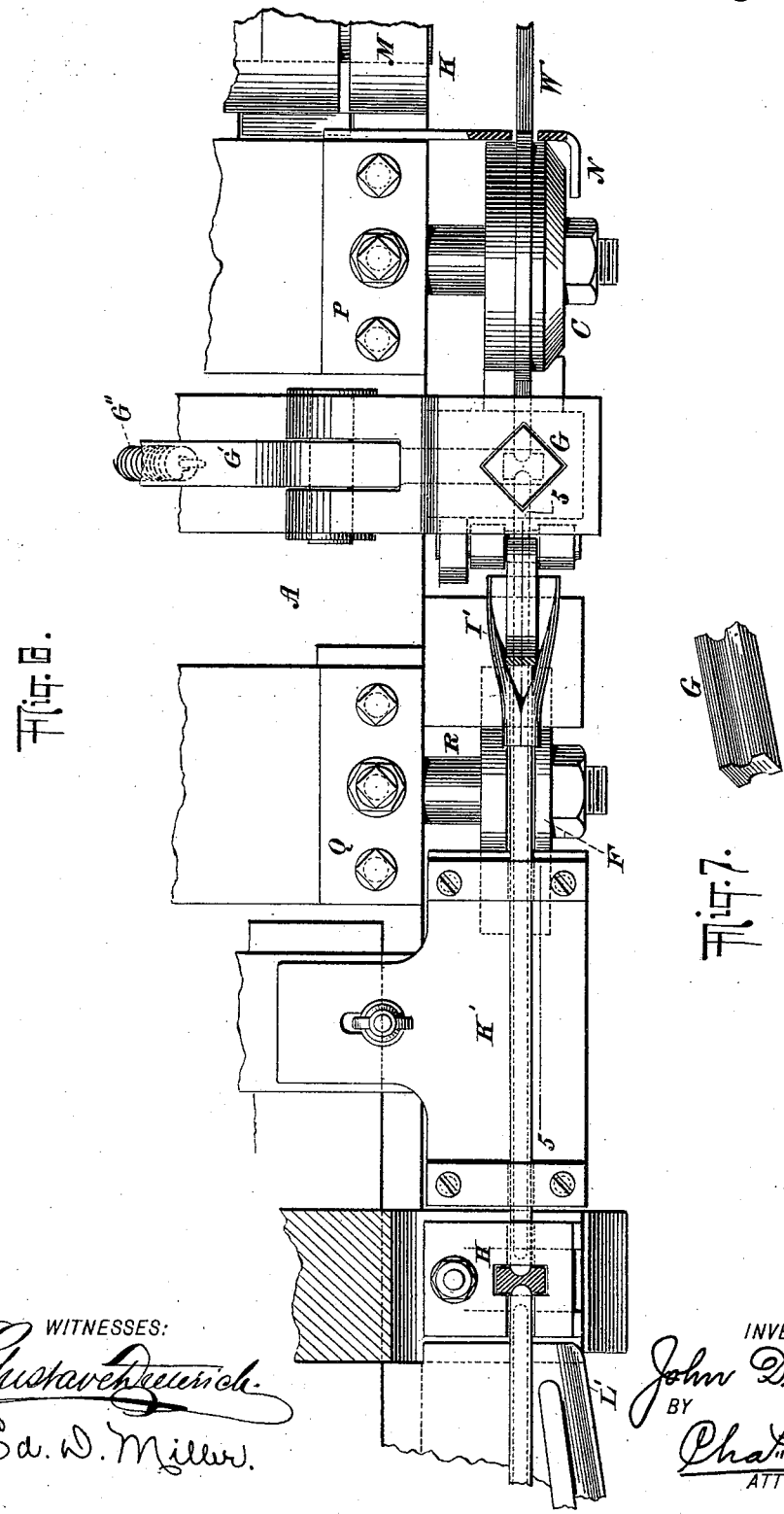
WITNESSES:
Gustave Dieterich.
Ed. D. Miller.
INVENTOR
John Draher,
BY
Chas. E. Gill
ATTORNEY.

(No Model.)  7 Sheets—Sheet 7.
J. DRAHER.
MACHINE FOR MAKING CORSET STIFFENERS.
No. 543,856.  Patented Aug. 6, 1895.
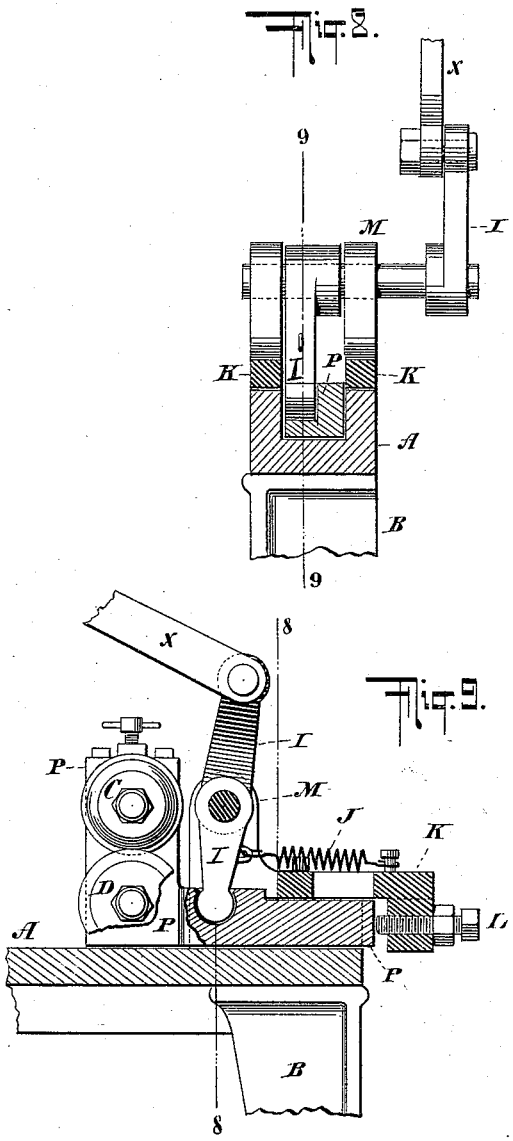

UNITED STATES PATENT OFFICE.

JOHN DRAHER, OF WATERBURY, CONNECTICUT, ASSIGNOR TO MORITZ COHN, OF NEW YORK, N. Y.

MACHINE FOR MAKING CORSET-STIFFENERS.

SPECIFICATION forming part of Letters Patent No. 543,856, dated August 6, 1895.

Application filed April 27, 1894. Serial No. 509,226. (No model.)

*To all whom it may concern:*

Be it known that I, JOHN DRAHER, a citizen of the United States, and a resident of Waterbury, in the county of New Haven and State of Connecticut, have invented certain new and useful Improvements in Machines for Making Covered Corset-Stays, of which the following is a specification.

The invention relates to improvements in machines for making covered corset-stays; and it consists in the novel features of construction and combinations of parts hereinafter fully described, and particularly pointed out in the claims.

In accordance with my invention the flat wire or metal strip and the ribbon of paper or other suitable covering material are fed into the machine from reels, the wire passing between suitable dies by which it is severed into suitable lengths, and also through mechanism by which said lengths are separated a short distance from each other at their ends, and the ribbon of paper first passing over a paste-roller and then meeting and moving onward with the line of severed lengths of wire in a continuous manner first through a folder, which folds the ribbon around the wire, then through pressure-rollers which cause the firm adherence of the paper and wire, and finally through a pair of dies which sever the continuous ribbon of paper inclosing the wire at points intermediate the previously-separated ends of the lengths of the latter, leaving a tip of the paper at each end of each length of the wire. Each length of the wire thus produced and covered forms a corset-stay of superior quality and efficiency.

The mechanism by which the corset-stays are manufactured in the manner above briefly outlined constitutes the subject of this application, and will be readily understood from the detailed description hereinafter presented, reference being had to the accompanying drawings, in which—

Figure 2:
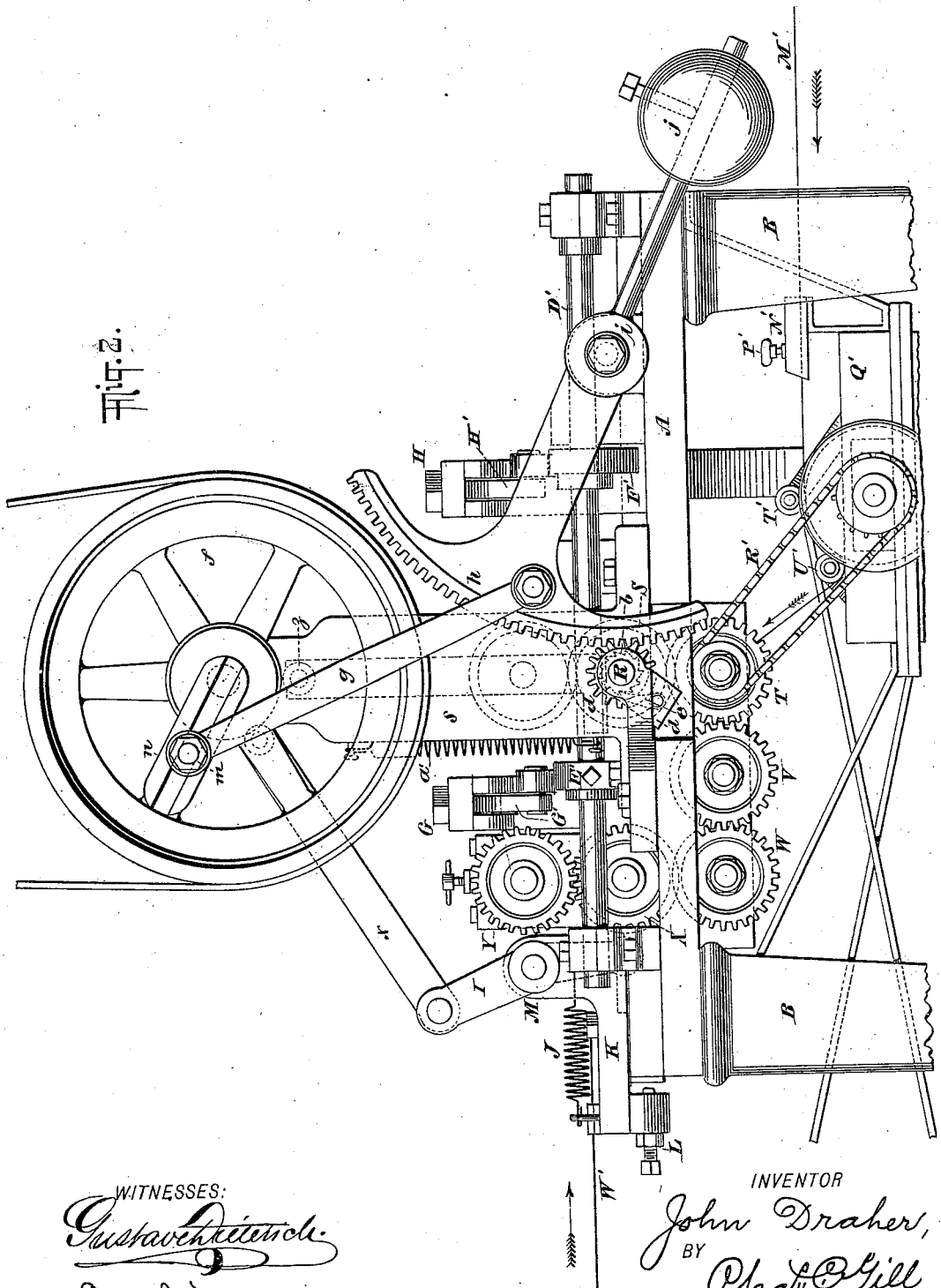
Figure 3:
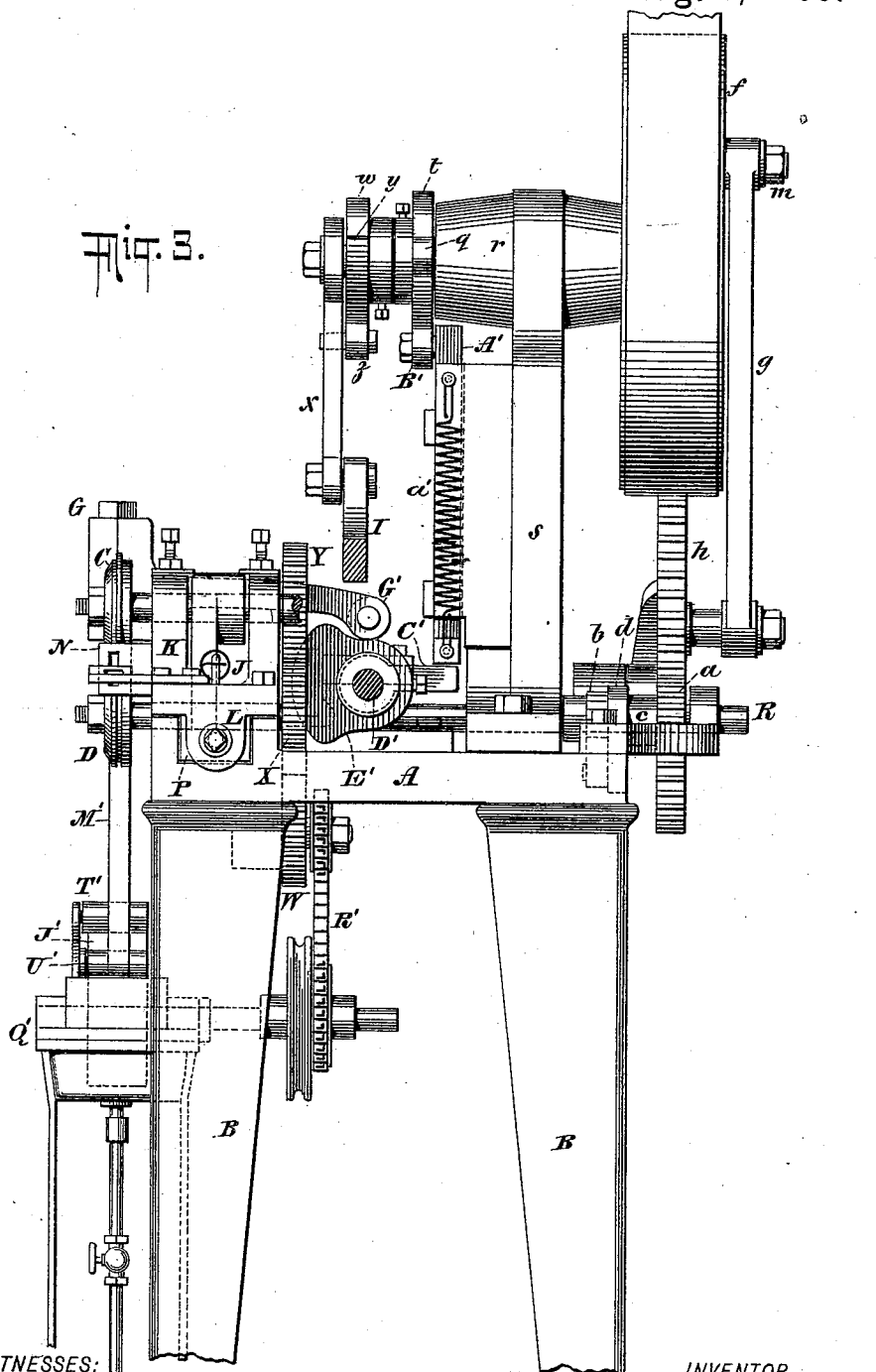
Figure 4:
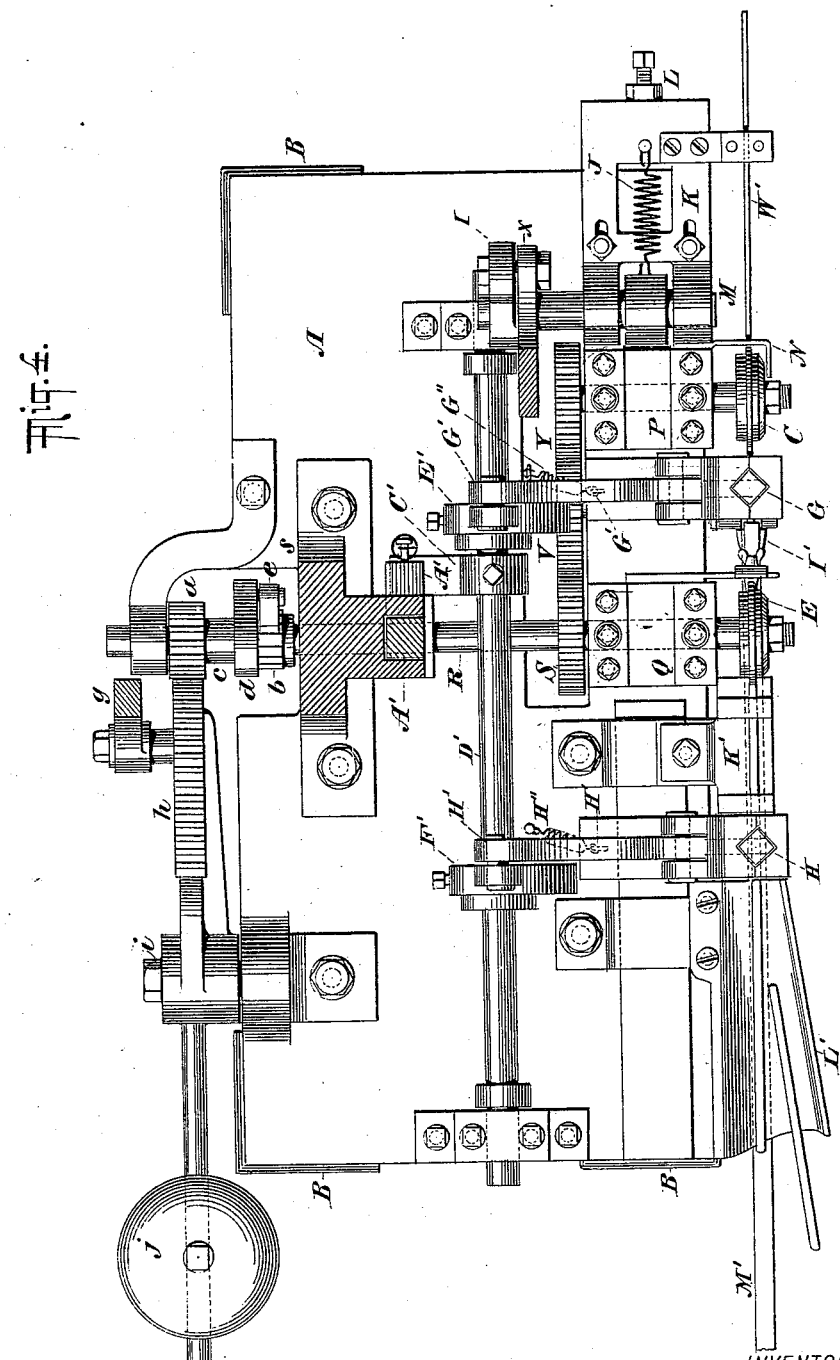
Figure 5:
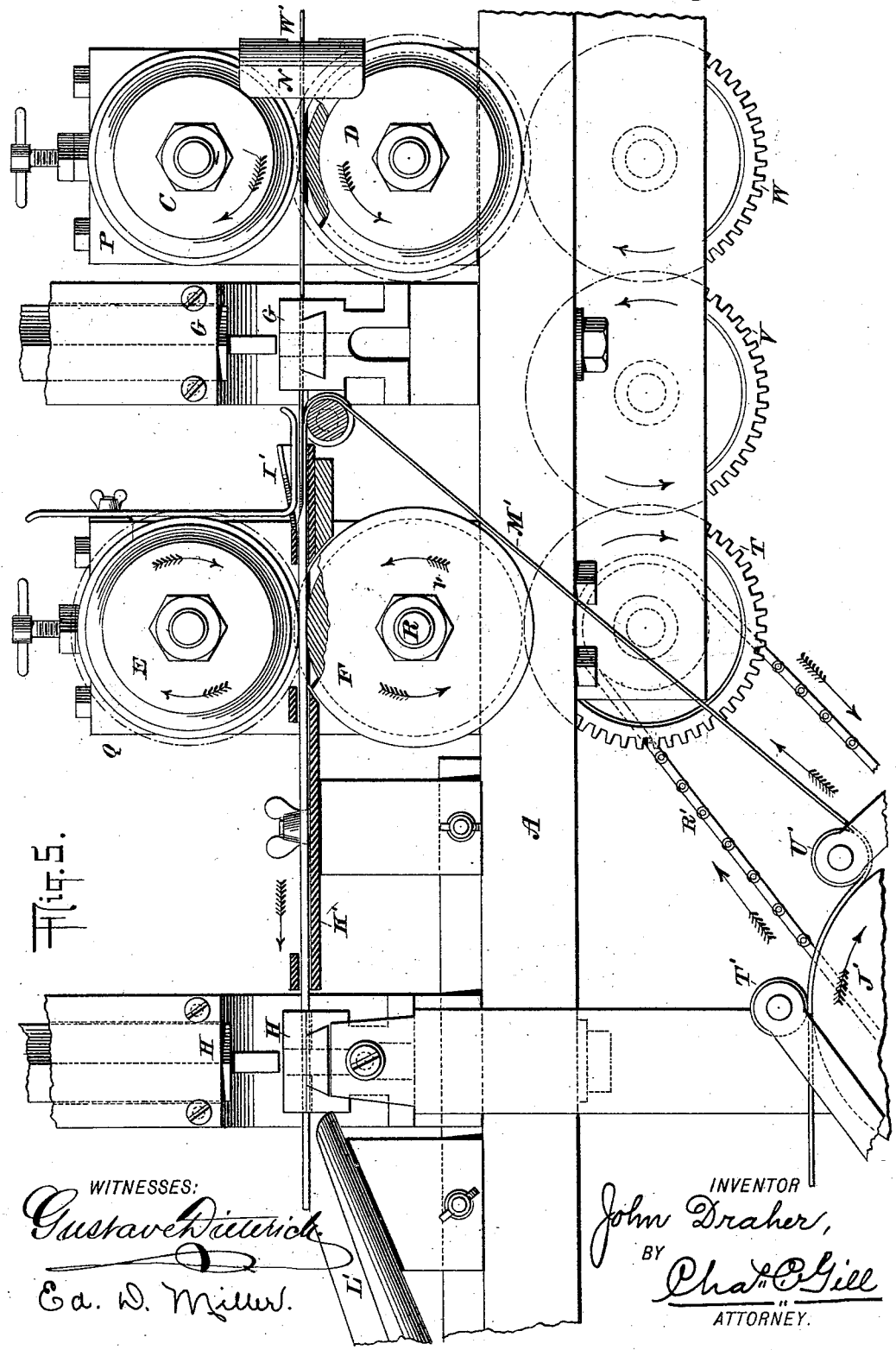

Figure 1 is a front elevation of a machine constructed in accordance with and embodying the invention. Fig. 1ª is an enlarged detailed view of a spring-guide through which the paper strip passes on its way to the pasting-roller. Fig. 2 is a rear elevation of said machine. Fig. 3 is an end view of same. Fig. 4 is a top view of same partly in section on the dotted line 4 4 of Fig. 1. Fig. 5 is an enlarged front elevation of a part of the machine, the same being partly in section on the dotted line 5 5 of Fig. 6. Fig. 6 is an enlarged top view of same partly broken away and partly in section. Fig. 7 is a detached perspective view of a portion of one of the cutting-dies, being presented to indicate the form of the face thereof. Fig. 8 is a vertical transverse section through a portion of the machine, the section being on the dotted line 8 8 of Fig. 9, which is a vertical longitudinal section through the same portion of the machine, this section being on the dotted line 9 9 of Fig. 8.

In the drawings, A represents the bed-plate or table of the machine, and B suitable supporting-legs therefor. At the front edge of the bed-plate A are the pairs of feed-rollers C D and E F, respectively, and intermediate these pairs of rollers is the pair of cutting-dies G, while at the left of the second pair of rollers E F is the pair of cutting-dies H. The rollers C D are mounted upon shafts which are journaled in the carriage P, which is adapted to have a definite reciprocating movement on the bed-plate A toward and from the dies or cutters G, the movement of said carriage toward the dies G being effected by the pivotally-mounted lever I and that in the reverse direction by the coiled spring J. At the right of that portion of the carriage P directly carrying the rollers C D is secured upon the bed A the open frame K, which is capable of adjustment toward or from that portion of the carriage P directly carrying the rollers C D, and is provided with an adjusting-screw L. The left-hand end of the frame K forms the lugs M, in which the shaft of the lever I is journaled, and between which the lower arm of the said lever is located. The lower end of the lever I is rounded, as shown, and enters a correspondingly-rounded socket in an extension of said carriage P, as indicated in Fig. 1, the object being to cause said lever, when rocked with its shaft, to move the carriage. The movement of the carriage P with the rollers C D toward the dies G is a limited one, and takes place at the time said dies are in the operation of cutting the wire. The form of the lever I is that of a bell-crank, as shown in Fig. 8, its two arms being separated laterally from each other, but rigidly mounted on their shaft, which is journaled in the lugs M and fully shown in Fig. 8. The lower arm of the lever I engages the horizontal portion of the carriage P, as more clearly shown in Fig. 9, and the upper arm of said lever is pivotally connected to the lower end of the rod $x$, hereinafter referred to. At the left-hand side of the carriage P is the bent steel plate N, which acts as a guide through which the wire to be covered passes on its way between the rollers C D.

The feed-rollers E F have their shafts journaled in the stationary frame or journal-box Q, and said rollers are in line with the rollers C D, but are slightly greater in diameter than the same, and consequently feed with a little greater rapidity than the rollers C D. The shaft of the lower roller F is lettered R and is provided adjacent to the inner side of the journal-box Q with the gear-wheel S, which imparts motion through the connected chain of gear-wheels T V W X Y to the rollers C D. The shaft R extends across the top of the bed-plate A, as shown in Fig. 4, and carries upon its outer end the clutch and gearing consisting of the gear-wheel $a$, sleeve $c$, block $d$, and pawl $e$, the whole being connected together and loosely mounted upon the said shaft R. Adjacent to the block $d$ there is fast upon the shaft R the small ratchet-wheel $b$, which is engaged by the pawl $e$.

The shaft R receives an intermittent motion from the main driving-wheel $f$ through the medium of the connecting-rod $g$ and segmental gearing $h$, the latter being mounted upon the stud $i$ and provided with the counterbalance-weight $j$, which is adjustable by means of a set-screw, as illustrated in Fig. 2. The segmental gearing $h$ engages the gear-wheel $a$ on the shaft R, and rotates the same during the oscillating movement of the said segmental gearing due to the action of the connecting-rod $g$. It is intended that the shaft R shall at all times revolve in the same direction, though having an intermittent motion, and to accomplish this purpose the pawl $e$ and ratchet $b$ are provided. During the upward motion of the segmental gearing $h$ the gear-wheel $a$ will be engaged thereby and rotated, and since this gear-wheel $a$ is connected with the sleeve $c$ and block $d$, and the pawl $e$ engages the ratchet $b$, the rotation of said wheel $a$ will result in the shaft R being likewise rotated, since at such time the pawl $e$ will engage the teeth of the ratchet $b$, and the latter being fast on the shaft R the said shaft will have a rotating motion corresponding with the extent of movement of the segmental gearing $h$. During the downward movement of the segmental gearing $h$ the gear-wheel $a$ will likewise be engaged, but during such time the shaft will remain at rest, owing to the fact that the pawl $e$ will ride over the teeth of the ratchet $b$ and the sleeve $c$ will revolve loosely on the said shaft R.

The extent of the movement of the shaft R will regulate the movement of the gear-wheels S T V W X Y and rollers C D and E F, and consequently the extent of the feed action of the said rollers. The movement of the segmental gearing $h$, and consequently the movement of the shaft R, with its connecting parts, may be regulated at will by the adjustment of the screw $m$ at the upper end of the connecting-rod $g$, said screw being utilized to retain the upper end of the said connecting-rod against the radially-slotted guide $n$, formed on the rear surface of the wheel $f$.

The wheel $f$ will receive the usual belt for driving the machine, and is mounted upon a shaft $q$, journaled in the bearing $r$, which, as illustrated in Fig. 3, is at the upper end of the standard $s$. The front end of the shaft $q$ has upon it the cam $t$ and cam $w$, said cams being secured in the desired position by set-screws, as illustrated in Fig. 3. Upon the front end of the shaft $q$ is loosely mounted the upper end of the connecting-rod $x$, which is pivotally connected at its lower end to the rocking lever I, hereinbefore described, and imparts the desired motion to said lever for the purpose of reciprocating the carriage P, carrying the feed-rolls C D. The upper end of the rod $x$ is slotted, as shown in Fig. 1, to allow a definite play of the said rod on the shaft $q$ under the action of the spring J and cam $w$, which, as shown, has a shoulder $y$. The rod $x$ carries at its upper end a small roller $z$, which rides against the peripheral edge of the said cam $w$, and through said roller the cam $w$ actuates the rod $x$. The spring J is connected with the lower end of the lever I, as indicated in Figs. 1 and 9, and has the effect through said lever of giving the carriage P a constant tension outward to the right and of forcing the rod $x$ toward the cam $w$, and thereby the roller $z$ is preserved in firm and constant contact with the edge of said cam $w$. During the rotation of the shaft $q$ the roller $z$, following the edges of the cam $w$, will upon reaching the shoulder $y$ quickly descend the same, thus permitting the rod $x$ to approach the shaft $q$ a distance equal to the height of the said shoulder $y$, and this has the effect of drawing the upper end of the lever I toward the shaft and likewise of moving the lower end of said lever outward toward the right, thus moving the carriage P to its initial position. As the cam $w$ continues to revolve, the roller $z$ will follow the edges thereof, and when approaching the greater protruding part of said cam will turn the lever I so that its upper end will be moved toward the right and its lower end to the left, and this will have the effect of imparting a slight movement in the carriage P toward the left.

The cam $t$ on the shaft $q$ is used for the purpose of depressing at the proper time the vertical slide A', which carries a roller B' in contact with said cam and at its lower bent end terminates over the arm C', secured to the rock-shaft D', as illustrated more clearly in Fig. 4. The rock-shaft D' through its connecting-arms, hereinafter referred to, operates the cutting-dies and receives its entire motion from the main driving-shaft $q$ through the said cam $t$ and slide A'. Upon the rock-shaft D' there are secured the cams E' F', the former of which is below a roller on the pivoted rod G', connected with the upper cutting-die G, and the latter of which is below a roller on the pivoted rod H', connected with the upper cutting-die H. When during the revolution of the shaft $q$ the projection on the cam $t$ rides against the roller B', the slide A' will be depressed and coming into contact with the arm C' will depress the same and rock the shaft D' toward the rear, thus causing the cams E' F' to turn upward against the arms G' H' and depress the upper dies G H, the former cutting through the wire and the latter cutting through the paper at a point intermediate the ends of the strips of wire. The arms G' H', after being acted on to depress the upper dies G H, are returned to their normal position by the springs G'' H'', which are ordinary coiled springs connected at their upper ends to said arms G' H', and at their lower ends secured by a pin or any other ordinary means to the bed-plate A of the machine, as indicated in Fig. 4.

Between the rollers E F and the cutting-dies G there is the folder I', composed of a strip of sheet metal of a form adapted to permit the passage through it of the paper and the wire and to fold the paper around the wire in a manner well known in the art. The folder I' is in the line of travel of the wire through the rollers C D and E F and, as indicated in Fig. 1, receives both the wire and strip of paper, the latter having passed over the paste-roller J', and being in a condition to be folded upon the wire and then pressed firmly thereon during the passage of the combined strip of paper and wire between the rollers E F. At the left of the rollers E F there is provided the table K', over which the strip of covered wire passes on its way to the dies H, which simply sever the strip at points intermediate the lengths of the wire and permit the severed lengths to enter the trough L', by which they are delivered to any suitable receptacle. The ribbon or strip of paper is lettered M', and on its way to the paste-roller J' passes through the guide N', which is simply an open frame (illustrated more clearly in Fig. 1ª) provided with the spring O' and set-screw P', the purpose of the latter being to regulate the tension of the said spring on the said paper while being fed to the paste-roller J'. The paste-roller J' is mounted in the paste-receptacle Q', and receives its motion from the shaft of the gear-wheel T through the medium of the chain R'.

The paste-receptacle Q' is provided with the steam-jacket S', by which the adhesive material may be kept in a soft condition, and also with the small rollers T' U', which are in close relation to the periphery of the wheel or roller J' and between which and said wheel or roller the strip of paper M' is fed. As illustrated in Fig. 1, the paper M' passes from a reel through the guide and tension device N', thence over the roller J', beneath the small rollers T' U', and thence upward over the small roller at the mouth of the folder I', at which point the paper enters and passes through the said folder and meets the wire lettered W', the glued surface of the paper turning uppermost and coming into direct contact with the wire W', while the shape of the folder I' causes the said paper to completely envelop the said wire preparatory to the passage of the continuous strip through the rollers E F and dies H.

In the operation of the machine the wire W' passes from its reel inward to and between the rollers C D, thence between the dies G and into and through the folder I', and then between the rollers E F, and finally between the dies H, while the paper passes from its reel over the paste-roller J', and thence into the folder I', where it meets and is folded around the wire and passes on with the same between the rollers E F and dies H. The machine is set in motion by power applied to the wheel $f$, and this wheel and its shaft being in motion and the wire and paper being in position the rollers C D and E F will be revolved to effect the feeding of the wire and paper by means of the shaft R receiving its motion from the wheel $f$ through the connecting-rod $g$ and segment $h$ and imparting the same through the gear-wheels S T V W X Y to said rollers. Every time a sufficient length of the wire for one corset-stay has been fed to the left beyond the cutters G, said length must be severed by said cutters, and at such time the projection on the cam $t$, acting through the slide A', arm C', rock-shaft D', cam E', and rod G', causes the upper cutter G to descend and sever said length of wire, while almost simultaneously the cam $w$ has acted on the roller $z$ and connecting-rod $x$ to force the upper end of the lever I outward, and hence to force the lower end of said lever and carriage P inward toward the cutters G. As soon as the projecting portion of the cam $t$ passes the roller B' on the slide A', the spring $a'$ immediately elevates said slide and permits the rock-shaft D' and upper cutters to regain their normal position under the action of the springs G'' H'', while almost immediately the roller $z$ on the rod $x$ reaches and descends the shoulder $y$ on the cam $w$, and the spring J in consequence thereof draws the lower end of the lever I and carriage P toward the right to their initial positions, when the feeding of the wire will continue as before and another length of the wire for a stay will be fed into the machine and beyond the cutters G, whereupon, as before, the carriage P will travel toward the left, and the cutter G will descend to sever the length, after which the spring J will return the carriage to the right in position to continue the inward feeding of the wire.

The fact that the rollers C D are a little less in diameter than the rollers E F results in the latter having a slightly more rapid feeding action than the rollers C D, and hence it is that the carriage P is given the short reciprocating movement toward and from said rollers E F. As above set forth, the cutters G sever the lengths of wire, and as it is desired that a space be left between the different lengths of wire within the paper covering it is essential that the rollers E F feed a little more rapid than the rollers C D, and that to prevent friction and strain the rollers C D, with their carriage P, advance and recede under the influence of the lever I, as above set forth.

The lengths of wire severed from the continuous piece by the cutters G are drawn inward by the rollers E F, and while passing through the folder I' are covered and connected by the paper M'. The connected strip of folded paper inclosing the independent slightly-separated lengths of wire is severed into stays by the cutters H under the action of the rock-shaft D' and cam t, as hereinbefore explained.

What I claim as my invention, and desire to secure by Letters Patent, is—

1. In a machine for making covered corset stays the two pairs of feed rolls, and mechanism substantially as described for reciprocating the first pair of rollers toward and from the second pair thereof, combined with the cutters and folder intermediate said pairs of rolls, the whole being constructed and arranged to operate, substantially as and for the purposes set forth.

2. In a machine for making covered corset stays, the two pairs of feed rolls, and mechanism substantially as described for reciprocating the first pair of said rolls toward and from the second pair thereof, combined with the cutters and folder intermediate said pairs of rolls, and the cutters beyond the second pair of rolls, the whole being constructed and adapted to operate substantially as and for the purposes set forth.

3. In a machine for making covered corset stays, the pair of feed rolls mounted on a movable carriage, mechanism substantially as described for reciprocating said carriage from the main driving shaft, and the pair of feed rolls in line with and greater in diameter than the first mentioned rolls, combined with the cutters and folder intermediate said rolls, and the cutters beyond the second pair of said rolls; substantially as and for the purposes set forth.

4. In a machine for covering wire, the pair of reciprocating feed rolls, the pair of feed rolls mounted in stationary bearings, the shaft extending from one of said rolls and connected by a chain of gearing with the others thereof, the loose gear and pawl and fixed ratchet on said shaft, the segmental gear engaging said loose gear, the drive wheel, and the connecting rod intermediate said drive wheel and segmental gear, combined with the cutters and folder intermediate said pairs of rolls and the cutters beyond the second pair of rolls; substantially as and for the purposes set forth.

5. In a machine for covering wire, the two pairs of feed rollers, and mechanism for reciprocating the first pair of same, combined with the cutters and folder intermediate said pairs of rollers, the cutters beyond the second pair of rollers, the rock-shaft having cams in engagement with arms operating said cutters, the cam on the main driving shaft, the vertical slide engaged by said cam, and the arm on the rock-shaft below the lower end of said slide; substantially as and for the purposes set forth.

6. In a machine for covering wire, the two pairs of feed rollers, the rocking lever connected with the carriage of the first pair of said rollers, the spring acting on said lever, the connecting rod intermediate said lever and the driving shaft, and the cam on said shaft engaging said rod, combined with the folder and cutters intermediate said pairs of rollers; substantially as and for the purposes set forth.

7. In a machine for covering wire, the two pairs of feed rollers, and mechanism for reciprocating the first pair thereof, combined with the cutters and folder intermediate said pairs of rollers, and mechanism for revolving said rollers from the drive wheel, said mechanism consisting of the segmental-gear, the adjustably mounted connecting rod intermediate said gear and wheel and the shaft having the loose gear and clutch at one end and at the other connected with the train of gearing for said rollers; substantially as and for the purposes set forth.

8. In a machine for making covered corset stays, the two pairs of feed rolls, mechanism for revolving the same from the driving shaft, and mechanism for reciprocating one pair of said rolls, combined with the paste roller for the strip of paper, the folder and cutters intermediate said pairs of rolls, gearing intermediate said roller and the gearing operating the said feed rolls, and the cutters beyond the second pair of feed rolls; substantially as and for the purposes set forth.

Signed at Waterbury, in the county of New Haven and State of Connecticut, this 21st day of April, A. D. 1894.

JOHN DRAHER.

Witnesses:
DANL. F. WEBSTER,
CHAS. LAWLOS.